S. B. CLAY.
BOLT THREADING MACHINE.
APPLICATION FILED OCT. 27, 1919.
1,377,146.
Patented May 3, 1921.
3 SHEETS—SHEET 3.
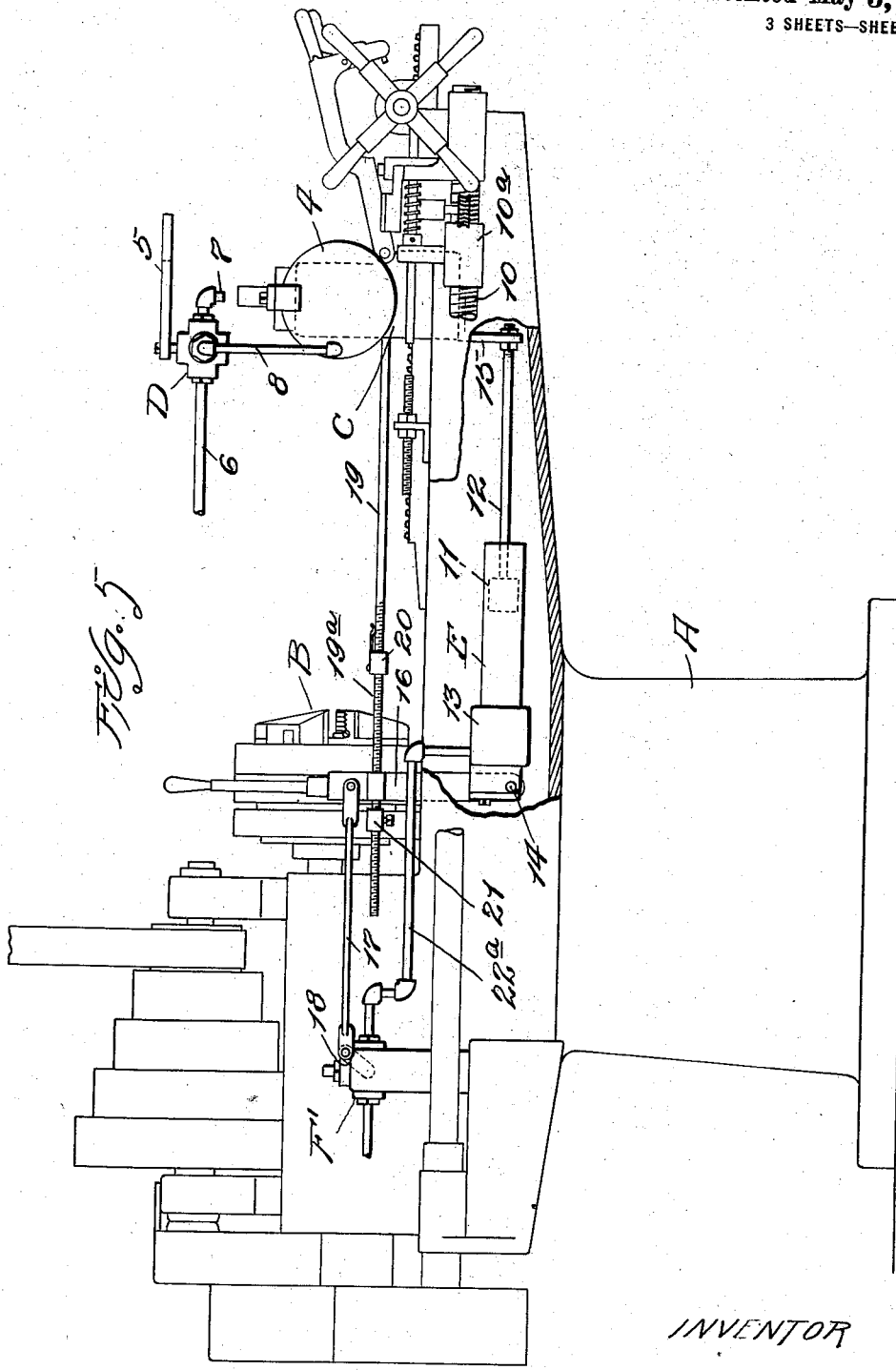
INVENTOR
SAMUEL B. CLAY,
by Bakewell & Church Att'ys.

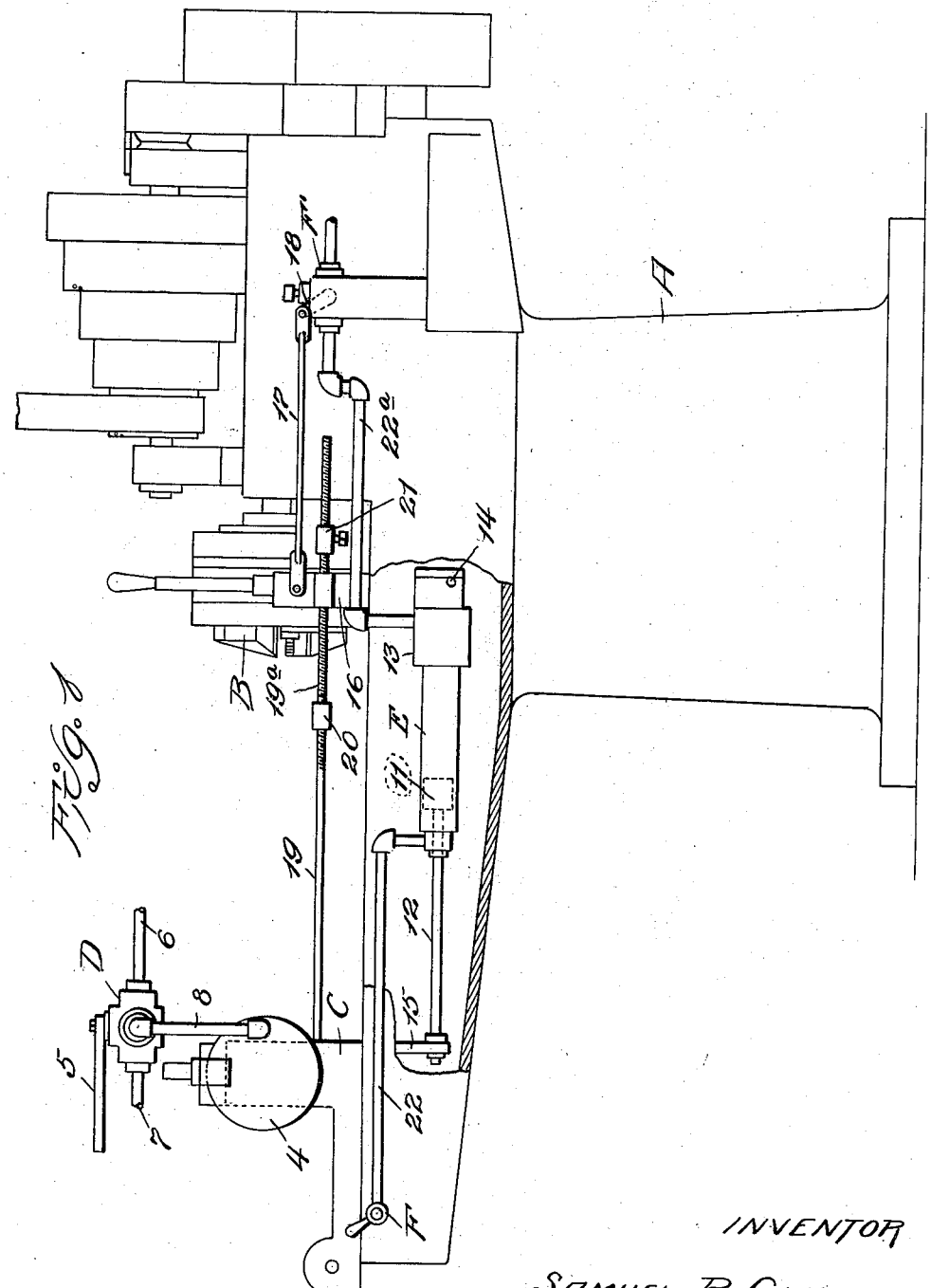

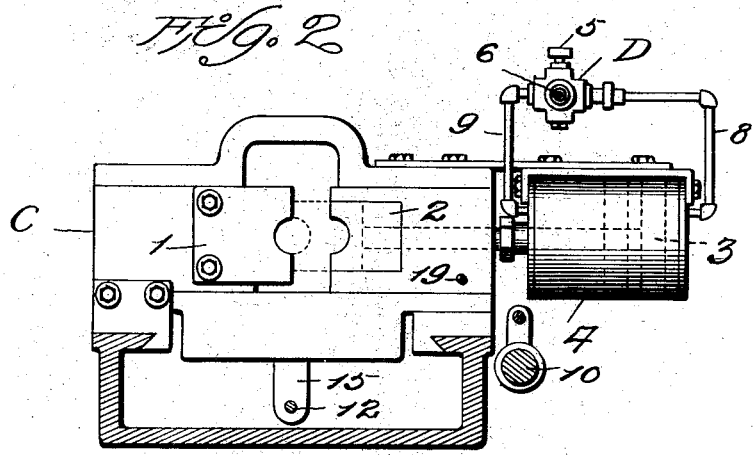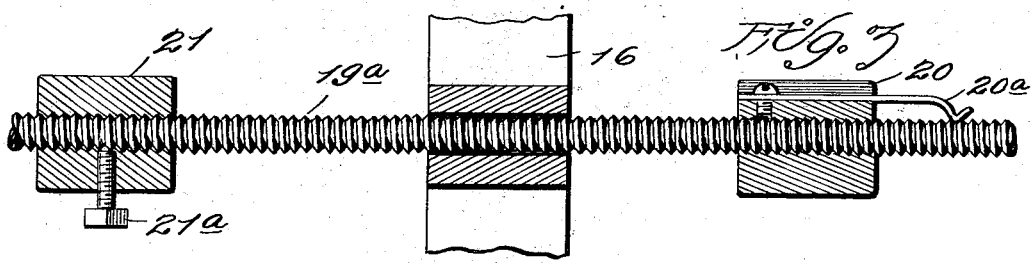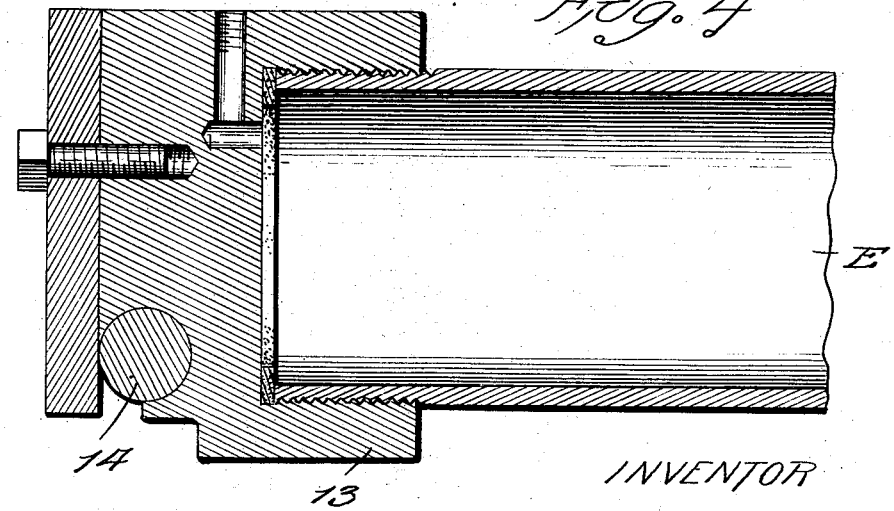

UNITED STATES PATENT OFFICE.

SAMUEL B. CLAY, OF ST. LOUIS, MISSOURI, ASSIGNOR OF ONE-HALF TO EDWARD R. FISH, OF WEBSTER GROVES, MISSOURI.

BOLT-THREADING MACHINE.

1,377,146.   Specification of Letters Patent.   Patented May 3, 1921.

Application filed October 27, 1919. Serial No. 333,593.

*To all whom it may concern:*

Be it known that I, SAMUEL B. CLAY, a citizen of the United States, residing at St. Louis, Missouri, have invented a certain new and useful Improvement in Bolt-Threading Machines, of which the following is a full, clear, and exact description, such as will enable others skilled in the art to which it appertains to make and use the same.

This invention relates to bolt and pipe threading machines.

One object of the invention is to provide a bolt or pipe threading machine which is equipped with means for automatically returning the carriage to its starting position at the termination of the threading operation.

Another object is to provide a bolt and pipe threading machine which is so constructed that the operator in charge of the machine merely has to turn a valve to cause the carriage to feed the bolt or pipe toward the threading mechanism, the carriage being returned automatically to its starting position at the completion of the bolt threading operation.

To this end I have devised a bolt or pipe threading machine which preferably comprises a carriage operating means consisting of a piston arranged in a cylinder to which an operating medium is supplied and two valves for governing said operating medium, one of said valves being adapted to be turned manually by the operator in charge of the machine to feed the bolt or pipe toward the threading mechanism and the other valve being operated automatically to feed the bolt or pipe away from the threading mechanism at the termination of the threading operation. By constructing the machine in this manner I materially increase the operating speed of the machine, due to the time saved in actuating a manually operable device to feed the carriage toward the threading mechanism and to restore the carriage to its starting position, as is necessary with bolt and pipe threading machines of the kind now in general use, and I also make it possible for a girl to operate the machine, due to the fact that no strength on the part of the operator is required to feed the carriage.

For the sake of brevity, I will hereinafter use the word "bolt" to designate the work on which the machine operates, but I wish it to be understood that my invention is applicable to any kind of threading machine in which the work, whether it be a bolt, pipe or other device, is mounted on a carriage which is so arranged with relation to the threading mechanism that the work and the threading mechanism are separated automatically at the termination of the threading operation by a means operated by a fluid medium such as a hydraulic medium, steam, air, etc.

Figure 1 of the drawings is a side elevational view of a bolt threading machine constructed in accordance with my invention.

Fig. 2 is a vertical cross-sectional view of a portion of the machine, illustrating the means for operating the movable jaw of the bolt vise.

Fig. 3 is an enlarged vertical sectional view illustrating part of the mechanism for actuating the valve that causes the carriage to return automatically to its starting position.

Fig. 4 is an enlarged sectional view of a portion of the cylinder of the carriage feeding mechanism; and Fig. 5 is a side elevational view, illustrating a slight modification of my invention.

Referring to Fig. 1 of the drawings which illustrates the preferred form of my invention, A designates the base of a bolt threading machine, B the threading mechanism and C the carriage on which the bolt is mounted preparatory to the threading operation. The carriage C is preferably provided with a vise comprising a stationary jaw 1 and a movable jaw 2 that is moved toward and away from said stationary jaw by means of a piston 3 arranged in a cylinder 4 that is mounted in any preferred manner on the carriage C. In the form of my invention herein illustrated the movable jaw 2 of the vise is arranged to slide horizontally and the cylinder 4 is arranged at one side of the carriage in longitudinal alinement with the movable jaw 2, as shown in Fig. 2. Compressed air or any other suitable operating medium is supplied to the cylinder 4 by means of a valve D provided with an operating handle 5 arranged in such a manner that it can be grasped easily by the operator standing at the front of the machine. The casing of the valve D is provided with a supply pipe 6, an exhaust pipe 7 and two pipes 8 and 9 that lead to the opposite ends of the cylinder 4, thereby permitting the jaw 2 of the vise to be moved into clamping position by turning the handle 5 in one direction and restored to its inoperative position by moving said handle in the opposite direction.

In the preferred form of my invention, as illustrated in Fig. 1, a means that is adapted to be operated by a hydraulic medium or a medium under pressure is provided for moving the carriage C toward and away from the bolt threading mechanism B, said means comprising a cylinder E provided with a piston 11 whose rod 12 is connected to the carriage C. The cylinder E can be mounted in any preferred manner, but I prefer to support the head 13 of the cylinder on a horizontally-disposed shaft 14, as shown in Fig. 4, and connect the rod 12 of the piston to an arm 15 that projects downwardly from the carriage C, as shown in Fig. 1. Compressed air or any other suitable operating medium is admitted to and exhausted from the cylinder E by means of a manually-operated three-way valve F arranged at the front end of the machine and adapted to be turned by the operator in charge of the machine and an automatically operated three-way valve F' arranged at the rear end of the machine, as shown in Fig. 1. Means is provided for opening the valve F' automatically when the carriage C reaches the end of its stroke in one direction, namely, at the termination of the threading operation, and for closing said valve when said carriage reaches the end of its stroke in the opposite direction, namely, when it reaches its starting position. The mechanism herein illustrated for opening and closing the valve F' automatically consists of a rock arm or lever 16 that is connected by means of a link 17 with an arm 18 on the stem of the valve F' and a rod 19 connected to the carriage C and provided with tripping devices 20 and 21 that engage and move the rock arm 16 at certain points in the cycle of operations in the carriage C. When it is desired to feed the bolt to the threading mechanism the operator turns the valve F so as to admit compressed air or any other suitable operating medium to the front end of the cylinder E through the supply pipe 22, thereby causing the carriage to move rearwardly toward the threading mechanism B. When said carriage reaches a certain position the tripping device 20 engages the rock arm 16 and moves it in a direction to cause the valve F' to open at the termination of the threading operation, thereby causing an operating medium to enter the rear end of the cylinder E through the supply pipe 22$^a$, and thus move the piston 11 forwardly or in a direction to restore the carriage C to its starting position. Just before the carriage C reaches the end of its forward stroke the tripping device 21 on the rod 19 engages the rock arm 16 and moves it in a direction to cause the valve F' to close just as the carriage reaches its starting position, the operating medium that was previously admitted to the cylinder E through the pipe 22$^a$ being allowed to escape from said cylinder when the valve F' closes. The tripping devices 20 and 21 are preferably adjustably mounted on the rod 19 so as to enable the operation of the carriage C to be accurately controlled, said tripping devices being herein illustrated as being mounted on a screw-threaded portion 19$^a$ of the rod 19 and held in adjusted position on said rod by means of a spring detent 20$^a$ on the tripping device 20 and a set screw 21$^a$ on the tripping device 21.

While I prefer to equip the machine with a pneumatically-operated means or a hydraulically-operated means for moving the carriage rearwardly toward the threading mechanism, I do not wish it to be understood that my invention is limited to a machine of such construction, for if desired, a manually-operated means can be used for moving the carriage rearwardly toward the threading mechanism. Therefore, I have illustrated in Fig. 5 a machine of the same general construction as the machine shown in Fig. 1, except that the means used for feeding the carriage C rearwardly consists of a power-operated, screw-threaded rod 10 that passes through an internally screw-threaded member 10$^a$ on the carriage, as is now the usual practice in bolt threading machines.

Having thus described my invention, what I claim as new and desire to secure by Letters Patent, is:

1. A threading machine, comprising a threading mechanism, a carriage for holding the work, means for causing the work to be engaged by the threading mechanism, and means adapted to be operated by a fluid medium for automatically separating the work from the threading mechanism at the termination of the threading operation.

2. A threading machine, comprising a threading mechanism, a carriage for holding the work, and means adapted to be operated by a fluid medium for causing the work to be engaged by the threading mechanism and for automatically separating said work and threading mechanism at the termination of the threading operation.

3. A threading machine, comprising a threading mechanism, a carriage for holding the work, a means adapted to be reciprocated in one direction by a fluid medium for causing the work to be engaged by the threading mechanism and in the opposite direction to separate the work from the threading mechanism, and a manually operable valve and an automatically-operating valve for governing the operation of said means.

4. A threading machine, comprising a threading mechanism, a carriage for feeding the work to said threading mechanism, and means operated by a fluid medium for automatically returning said carriage to its starting position at the termination of the threading operation.

5. A threading machine, comprising a threading mechanism, a carriage for feeding the work to said threading mechanism, means adapted to be operated by a fluid medium for returning the carriage to its starting position, a valve for governing the medium that operates said means, and means for opening said valve automatically at the termination of the threading operation.

6. A threading machine, comprising a threading mechanism, a carriage for feeding the work to said threading mechanism, means adapted to be operated by a fluid medium for returning the carriage to its starting position, a valve for governing the medium that operates said means, and means for opening said valve automatically at the termination of the threading operation and for closing said valve automatically when the carriage is restored to its starting position.

7. A threading machine, comprising a threading mechanism, a carriage for feeding the work to said threading mechanism, a cylinder provided with a piston for restoring said carriage to its starting position, a valve for governing the supply of a fluid medium to and from said cylinder, and means carried by said carriage for causing said valve to open when the carriage reaches the end of its stroke in one direction and to close when said carriage reaches the end of its stroke in the opposite direction.

8. A threading machine, comprising a threading mechanism, a carriage for feeding the work to said threading mechanism, a cylinder provided with a piston that is connected to said carriage, a valve for governing the supply of a fluid medium to said cylinder, an actuating mechanism for said valve, and tripping devices carried by said carriage and arranged so as to engage said valve actuating mechanism and cause the valve to open at the termination of the threading operation and to close when said carriage is restored to its starting position.

9. A threading machine, comprising a threading mechanism, a carriage for feeding the work to said threading mechanism, a work holder on said carriage provided with a movable member, means adapted to be operated by a fluid medium for actuating said movable member to clamp and release the work, and means adapted to be operated by a fluid medium for automatically returning the carriage to its starting position at the termination of the threading operation.

10. A threading machine, comprising a threading mechanism, a carriage that feeds the work to said threading mechanism, means adapted to be operated by a fluid medium for moving the carriage toward said threading mechanism, and means for automatically returning said carriage to its starting position at the termination of the threading operation.

11. A threading machine, comprising a threading mechanism, a carriage for feeding the work to said threading mechanism, means adapted to be operated by a fluid medium for moving the carriage toward and away from said threading mechanism, two valves for governing the medium that operates said means, and means for opening one of said valves automatically at the termination of the threading operation.

12. A threading machine, comprising a threading mechanism, a carriage for feeding the work to said threading mechanism, a cylinder provided with a piston that is connected to said carriage, a manually-operable valve for admitting a fluid medium to one end of said cylinder so as to move the carriage toward the threading mechanism, a second valve for admitting the fluid medium to the opposite end of said cylinder, and means carried by the carriage to cause said second valve to open when the carriage reaches the end of its rearward stroke and to close when said carriage reaches the end of its forward stroke.

SAMUEL B. CLAY.